(12) United States Patent
Baughman et al.

(10) Patent No.: US 8,744,140 B2
(45) Date of Patent: Jun. 3, 2014

(54) REFLEXIVE IRIS TEMPLATE

(75) Inventors: Aaron K. Baughman, Fairfax, VA (US); Christian Eggenberger, Zurich (CH); Peter K. Malkin, Hawthorne, NY (US); Mweene J. Monze, Sandhurst (ZA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/605,012

(22) Filed: Sep. 6, 2012

(65) Prior Publication Data

US 2013/0011023 A1   Jan. 10, 2013

Related U.S. Application Data

(62) Division of application No. 12/535,025, filed on Aug. 4, 2009.

(51) Int. Cl.
   *G06K 9/00* (2006.01)

(52) U.S. Cl.
   USPC ........... 382/117; 382/102; 382/128; 351/205; 351/206; 351/208; 351/209; 351/210; 351/211; 351/212; 351/221

(58) Field of Classification Search
   CPC .......... G06K 9/00597; G06K 9/00604; G06K 2009/00932; G06K 2209/05; G06K 9/00281; G06K 9/00885; G06K 9/00013; G06K 9/0053; G06K 9/20; G06K 9/2027; G06K 9/6209
   USPC .......... 382/117, 102, 128; 351/205, 206, 208, 351/209, 210, 211, 212, 221
   See application file for complete search history.

(56) References Cited

U.S. PATENT DOCUMENTS

| | | | |
|---|---|---|---|
| 4,641,349 A * | 2/1987 | Flom et al. | 382/117 |
| 6,325,765 B1 | 12/2001 | Hay et al. | |
| 6,532,298 B1 | 3/2003 | Cambier et al. | |
| 6,714,665 B1 | 3/2004 | Hanna et al. | |
| 6,853,444 B2 | 2/2005 | Haddad | |
| 7,269,737 B2 | 9/2007 | Robinson | |
| 2005/0238210 A1 | 10/2005 | Sim | |
| 2005/0271258 A1 | 12/2005 | Rowe | |

(Continued)

FOREIGN PATENT DOCUMENTS

| CN | 1092372 C | 10/2002 |
|---|---|---|
| CN | 100337248 C | 9/2007 |

(Continued)

OTHER PUBLICATIONS

Rahmjoo, Office Action Communication for U.S. Appl. No. 12/535,025 dated Jul. 18, 2013, 13 pages.

(Continued)

*Primary Examiner* — Mike Rahmjoo
(74) *Attorney, Agent, or Firm* — Douglas A. Lashmit; Hoffman Warnick LLC

(57) ABSTRACT

A system, method and program product for providing a reflexive data collection system. A system is provided that includes: a system for defining a set of environmental conditions; a device for automatically implementing the set of environmental conditions; a system for collecting biometric data under the set of environmental conditions; and a system for encoding the biometric data and the set of environmental conditions into a reflexive template.

12 Claims, 3 Drawing Sheets

(56) References Cited

U.S. PATENT DOCUMENTS

2005/0281440 A1 12/2005 Pemer
2006/0080552 A1 4/2006 Lauper
2009/0169064 A1 7/2009 Kim et al.
2010/0183199 A1 7/2010 Smith et al.

FOREIGN PATENT DOCUMENTS

CN 101369311 A 2/2009
WO 2004042646 A1 5/2004
WO 2008139631 A1 11/2008

OTHER PUBLICATIONS

Rahmjoo, Office Action Communication for U.S. Appl. No. 12/535,025, dated Mar. 6, 2013, 8 pages.
Ratha et al., "Generating Cancelable Fingerprint Templates," Apr. 2007, pp. 561-572, IEEE Transactions on Pattern Analysis and Machine Intelligence, vol. 29, No. 4.
Lambert et al., "PCT Search Report and Written Opinion", International App. No. PCT/EP2010/060628, Nov. 5, 2010, 8 pages.
Nixon et al., "Novel Spectroscopy-Based Technology for Biometric and Liveness Verification", Proceedings of SPIE, vol. 5404, SPIE, Bellingham, WA, 2004, pp. 287-295.
Sutcu et al., "A Secure Biometric Authentication Scheme Based on Robust Hashing", MM-SEC '05, Aug. 1-2, 2005, New York, NY, pp. 111-116.
Hook et al., "New Pen Device for Biometrical 3D Pressure Analysis of Handwritten Characters, Words and Signatures", WBMA '03, Nov. 8, 2003, Berkeley, CA, pp. 38-44.
Waldmann et al., "Protected Transmission of Biometric User Authentication Data for Oncard-Matching", SAC '04, Mar. 14-17, 2004, Nicosia, Cyprus, pp. 425-430.
Rahmjoo, Office Action Communication for U.S. Appl. No. 12/535,025 dated Jun. 28, 2012, 14 pages.
Rahmjoo, Office Action Communication for U.S. Appl. No. 12/535,025 dated Dec. 17, 2012, 16 pages.
Rahmjoo, Office Action Communication for U.S. Appl. No. 12/535,025 dated Sep. 26, 2012, 8 pages.
Chinese Patent Office, Office Action for CN Application No. 2014010100212070 dated Jan. 6, 2014, 7 pages.

* cited by examiner

REFLEXIVE IRIS TEMPLATE

CROSS-REFERENCE TO RELATED APPLICATIONS

This application is a divisional of currently pending U.S. patent application Ser. No. 12/535,025 filed on Aug. 4, 2009. The application identified above is incorporated herein by reference in its entirety for all that it contains in order to provide continuity of disclosure.

FIELD OF THE INVENTION

This disclosure is related to verifying an identify of an individual using biometrics, and more particularly to a system and method of utilizing a reflexive iris template for capturing and verifying an identity of an individual.

BACKGROUND OF THE INVENTION

Identity verification has numerous applications, including granting login access to computer systems, granting physical access to buildings and rooms, interfacing with banks, etc. Various approaches for verifying identity are known and commonly used, including the use of passwords, the use biometrics such as fingerprint and retinal imagery, etc.

Biometrics are particularly useful in many applications in light of the fact that an individual does not need to remember a password or the like. Instead, unique physical, behavioral, physiological and or cognitive traits and characteristics can be utilized to identify and verify an individual. For example, every person has unique fingerprints that can be used to verify an identity with a high degree of certainty.

One of the drawbacks of biometrics however is that once a biometric image or template of an individual is compromised, an imposter may be able to impersonate the individual. For instance, biometric data for an individual may be encoded in a binary sequence, i.e., template. If the binary sequence was obtained by a third party, the third party could potentially utilize the binary sequence to, e.g., gain access to a computer system. Once compromised, the only way to ensure security for the individual would be to change the encoding scheme of the entire system.

Accordingly, a need exists for a biometric identity verification system that addresses the drawbacks of the prior art.

SUMMARY OF THE INVENTION

The present invention relates to a solution in which biometric data of an individual is combined with environmental data to provide a reflexive template that can later be used to verify the individual. Because the environmental conditions under which the biometric data is collected can be varied, the reflexive template can be readily canceled and a new one can be readily created.

In one embodiment, there is a system for collecting reflexive biometric data, comprising: a system for defining a set of environmental conditions; a device for automatically implementing the set of environmental conditions; a system for collecting biometric data under the set of environmental conditions; and a system for encoding the biometric data and the set of environmental conditions into a reflexive template.

In a second embodiment, there is a reflexive data verification system for verifying an identify of an individual, comprising: a system for retrieving and decoding a reflexive template associated with the individual to obtain at least one biometric data value and a set of environmental conditions under which the at least one biometric data value was obtained; a device for implementing the set of environmental conditions; a system for collecting at least one new biometric data value under the set of environmental conditions; a system for comparing the at least one biometric data value with the at least one new biometric data value to determine if a match exists; and a system for outputting a verification result.

In a third embodiment, there is a method of collecting reflexive biometric data, comprising: defining a set of environmental conditions; automatically implementing the set of environmental conditions; collecting biometric data under the set of environmental conditions; and encoding the biometric data and the set of environmental conditions into a reflexive template.

In a fourth embodiment, there is a method for verifying an identify of an individual, comprising: retrieving and decoding a reflexive template associated with the individual to obtain at least one biometric data value and a set of environmental conditions under which the at least one biometric data value was obtained; implementing the set of environmental conditions; collecting at least one new biometric data value under the set of environmental conditions; comparing the at least one biometric data value with the at least one new biometric data value to determine if a match exists; and outputting a verification result.

In a fifth embodiment, there is a computer readable medium having a program product stored thereon, which when run by a computer system, collects reflexive biometric data and comprises: program code for defining a set of environmental conditions; program code for implementing the set of environmental conditions; program code for causing a device to collect biometric data under the set of environmental conditions; and program code for encoding the biometric data and the set of environmental conditions into a reflexive template.

In a sixth embodiment, there is a computer readable medium having a program product stored thereon, which when run by a computer system verifies an identify of an individual and comprises: program code for retrieving and decoding a reflexive template associated with the individual to obtain at least one biometric data value and a set of environmental conditions under which the at least one biometric data value was obtained; program code for implementing the set of environmental conditions; program code for causing a device to collect at least one new biometric data value under the set of environmental conditions; program code for comparing the at least one biometric data value with the at least one new biometric data value to determine if a match exists; and program code for outputting a verification result.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
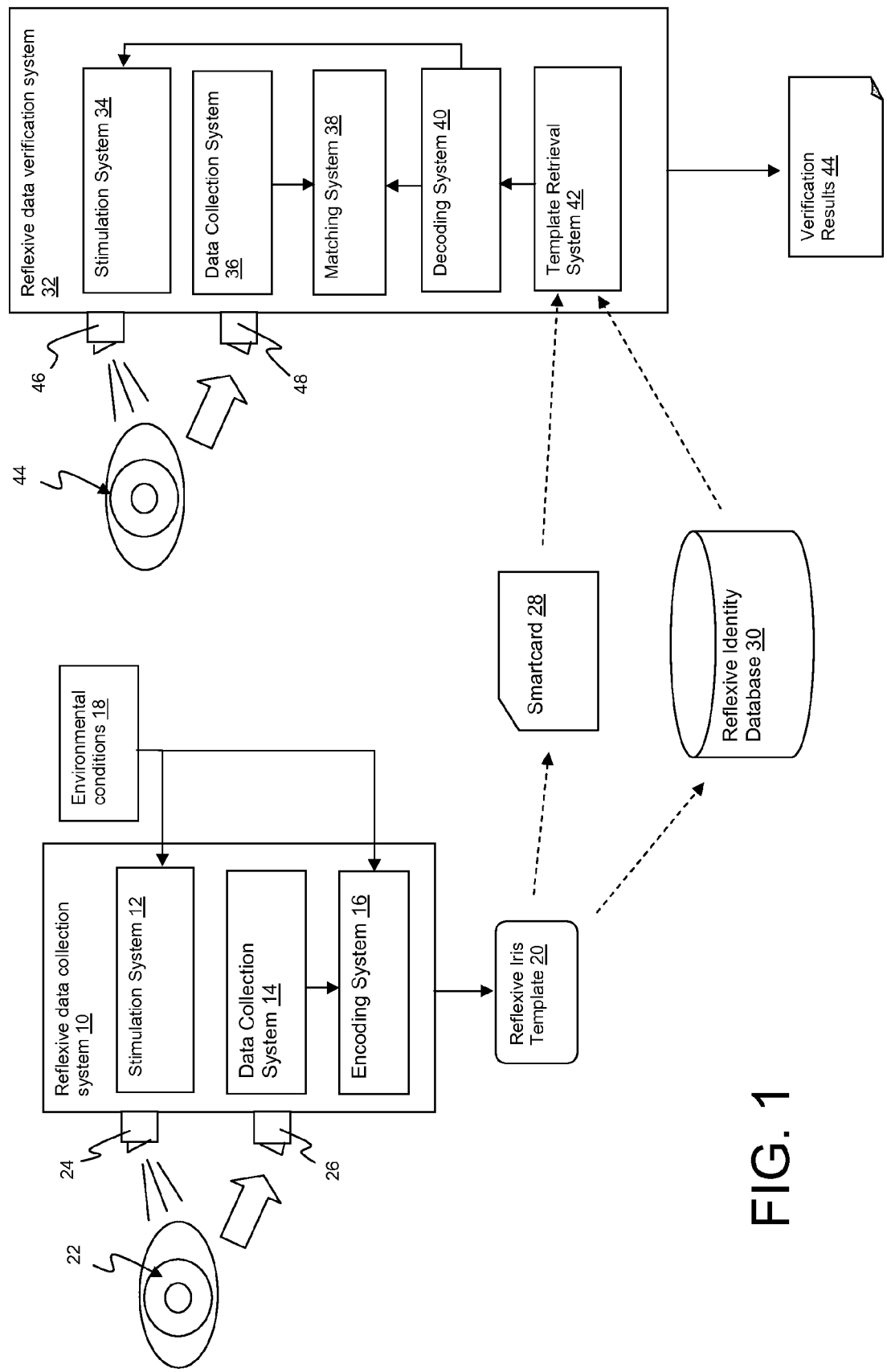
FIG. 1 depicts a reflexive data collection system and a reflexive data verification system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention provides a hybrid biometric that is based on both physiological (i.e., at least one biometric value) and behavioral properties (i.e., a set of environmental conditions under which the biometric value was obtained). The hybrid biometric is created by defining and causing a stimulation in an acquisition environment. The result, including both the collected physiological properties and the environmental conditions, are stored in a reflexive data template. For example, in the case of an iris, physiological properties such as shape, size and overlapping regions of the eye are collected under a defined set of controllable environmental conditions, such as light intensity, focal length temperature, etc. The results, including the environmental conditions, are stored in a reflexive iris template. Verification is achieved by reproducing the same environmental conditions and collecting a new set of physiological properties. A matching process then compares current physiological properties with stored physiological properties to verify the subject.

FIG. 1 depicts: (1) a reflexive data collection system 10 for collecting reflexive iris data from a subject's eye 22 and generating a reflexive iris template 20, i.e., a "set-up mode"; and (2) a reflexive data verification system 32 for verifying an identify of a subject by comparing new reflexive iris data from an eye 44 with the previously collected reflexive iris data obtained from an associated reflexive iris template 20, i.e., a "verification mode."

Reflexive data collection system 10 generally includes a stimulation system 12 for implementing a defined set of environmental conditions 18 for the subject's eye 22; a data collection system 14 for collecting biometric data under the environmental conditions 18; and an encoding system 16 for encoding the biometric data and environmental conditions 18 in reflexive iris template 20.

Environmental conditions 18 may comprise any type of stimulus with a controlled environment that can cause a change to the iris. The iris regulates the amount of the light that enters the eye and more significantly controls the depth of view and spherical aberration. As a result, the iris is constantly shifting and overlapping in yielding unique patterns given complex physiological, behavioral and environmental factors. Distinctive "iris folding" results from changes due to dilation. Each new iris folding is unique. For instance, intense light causes the pupil to contract; however, the pupil must expand for a sharp image acquisition. As the range of view increases, the iris generally expands. Accordingly, intense light and varying ranges of view can be utilized to stimulate changes to the iris pattern.

Accordingly, any type of stimuli, such as a selected light intensity, a type of target object (e.g., large vs. small, detailed vs. simple, etc.) the selected placement of a target object (e.g., near or far, left or right, etc.), temperature, time (e.g., amount of time of exposure), displayed color, field of view (e.g., depth of field), etc., can be used to effectuate a change to the iris shape.

Environmental conditions 18 may be static, e.g., have the subject view a target object under X amount of light at Y distance; or dynamic, change the environment N times over a course of M seconds and collect P images or measurements from the subject's eye 22. Stimulation system 12 may implement any reproducible environmental conditions 18 to stimulate a reaction (or set of reactions) in the iris of the subject's eye 22.

A stimulation device 24, such as a light source, computer screen, heat element, video display, etc., may be utilized to effectuate the stimulation, preferably within a controlled, reproducible environment. The stimulation may simply require the subject to stare at a point while a stimulation occurs, or require interaction from the subject, e.g., press a button when a displayed image is in focus, etc.

Data collection system 14 collects iris data from the eye 22 via a collection device 26. Iris data may comprise, e.g., image data, video data, infrared data, scan data, etc. Collection device 26 may comprise any device for collecting physiological data from the eye 22, e.g., a camera, video camera, a motion or heat detection system, etc. Data collection system 14 may also convert the collected iris data (such as image data) into one or more measurement values, such as a feature vector, that describes physiological characteristics of the iris (e.g., iris diameter, color, shape, overlapping regions, etc.).

In one illustrative embodiment, an iris measurement value may comprise a pupil dilation ratio $D_r$, given as:

$$D_r = \frac{P_{radius}}{I_{radius}}$$

where $P_{radius}$ is the radius of the pupil and $I_{radius}$ is the iris radius. In this case, the value $D_r$ and the defined environmental conditions 18, e.g., light intensity, time, induced field of view, etc., are encoded by encoding system 16 into for example a byte code and outputted as reflexive iris template 20. In another embodiment, the measurement value may be an iris shape.

As noted, encoding system 16 encodes the biometric data (e.g., iris measurement values) and environmental conditions 18 (i.e., stimuli settings) in a reflexive iris template 20. Reflexive iris template 20 can be embedded/stored in a portable token, such as a smart card 28, which the subject can carry and use for identity verification at any associated reflexive data verification system 32. Alternatively, reflexive iris template 20 can be stored in a reflexive identity database 30. The reflexive identity database 30 may for instance be implemented anywhere on a network that can be accessed by both the reflexive data collection system 10 and the reflexive data verification system 32. Moreover, reflexive identity database 30 may comprise any structure for storing reflexive iris templates, e.g., a table, a data object, etc.

When a subject requires identity verification, the subject's reflexive iris template 20 is presented to a template retrieval system 42 within reflexive data verification system 32. In the case where the reflexive iris template 20 is encoded in a smartcard 28, template retrieval system 42 may comprise, e.g., a smartcard reader. In the case where the reflexive iris template 20 is stored in reflexive identity database 30, template retrieval system 42 may comprise a database interface configured to obtain the template 20 based on, e.g., an inputted user name.

Once the reflexive iris template 20 for the subject is obtained, it is decoded (and decrypted if necessary) by decoding system 40. Decoding system 40 extracts the iris data for the subject and the environmental conditions 18 under which the iris data was collected. The environmental conditions 18 are fed to the stimulation system 34, which re-creates the same environment for collecting a new set of iris data from eye 44. Reflexive data verification system 32 includes a stimulation system 34, stimulation device 46, collection device 48, and data collection system 36 that operate in a manner similar to stimulation system 12, stimulation device 24, collection device 26 and data collection system 14 of the reflexive data collection system 10.

It is understood that the reflexive data collection system 10 and reflexive data verification system 32 may be integrated into a single device that performs both biometric collection and verification, or be implemented as standalone systems. Accordingly, a "set-up mode" and a "verification mode" may be implemented in a single unit, or in separate units.

Once the new iris data is collected by data collection system 36, it is passed to matching system 38, which matches the new iris data with the iris data extracted from the reflexive iris template 20. Any type of matching scheme may be utilized. For example, a Hamming distance, with independent environmental features in the form of a feature vector could be implemented. Furthermore, a Support Vector Machine could assist with matching like iris templates. Verification results 44 are then produced, e.g., match or no match. Verification results 44 may in turn be used to effectuate some logical or physical result, such as granting access to a server, opening a door, providing access to account data, etc.

Figure 2:
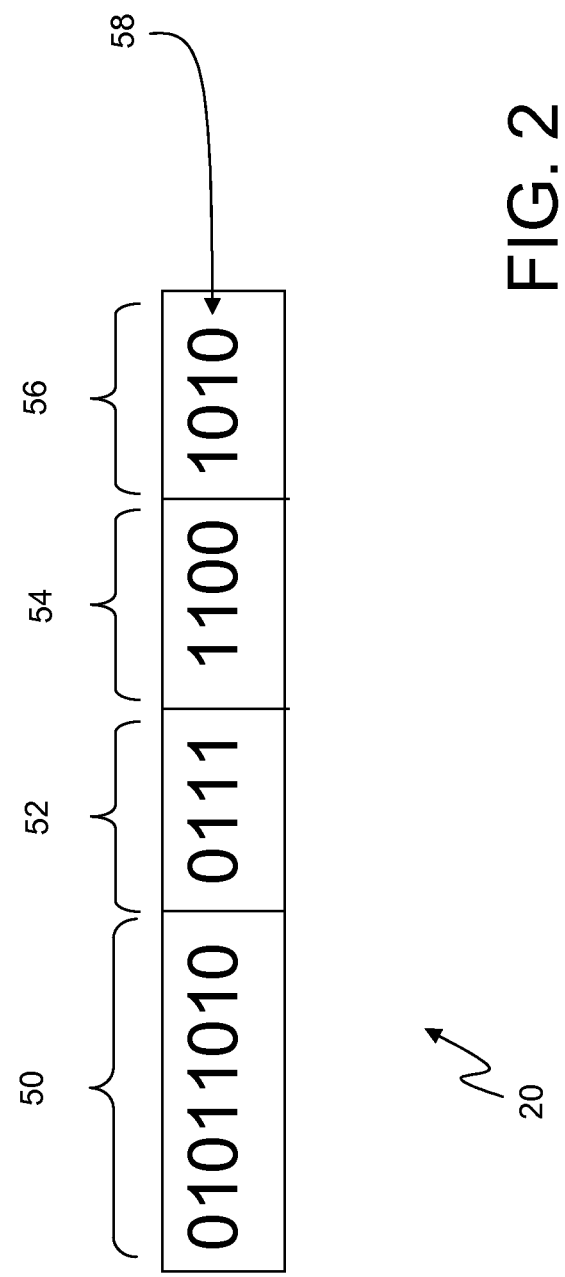
FIG. 2 depicts a reflexive iris template in accordance with an embodiment of the present invention.

FIG. 2 depicts an illustrative example of a reflexive iris template 20 that contains a byte code 58. Encoded in byte code 58 are a biometric measurement value and a set of environmental condition values. In this example, a first set of bits 50 provides an iris data value, e.g., a pupil dilation ratio; a second set of bits 52 defines a setting for a first environmental condition, e.g., a light intensity value; a third set of bits 54 defines a second environment variable, e.g., an amount of time of exposure; and a fourth set of bits 56 defines a third environmental variable, e.g., a range of view value. It is understood that FIG. 2 depicts a simple example of a reflexive iris templates 20, and obvious variations and extensions fall within the scope of the invention. For example, a series of biometric values obtained under different conditions could be stored. In addition, byte code 58 could be encrypted using any known technology.

In a further embodiment, the reflexive iris template 20 could be updated with an additional set of results each time a verification procedure takes place in order to provide a more robust set of biometric measurement values. In such a case, the reflexive iris template could be configured to hold a series of results that could be used for future biometric comparing operations.

It is understood that while the embodiments depicted in FIGS. 1 and 2 are directed at collecting and verifying iris based biometric data, the invention could apply to collecting and verifying any type of biometric data. For instance, the embodiments could be used with voice recognition, facial recognition, etc.

Figure 3:
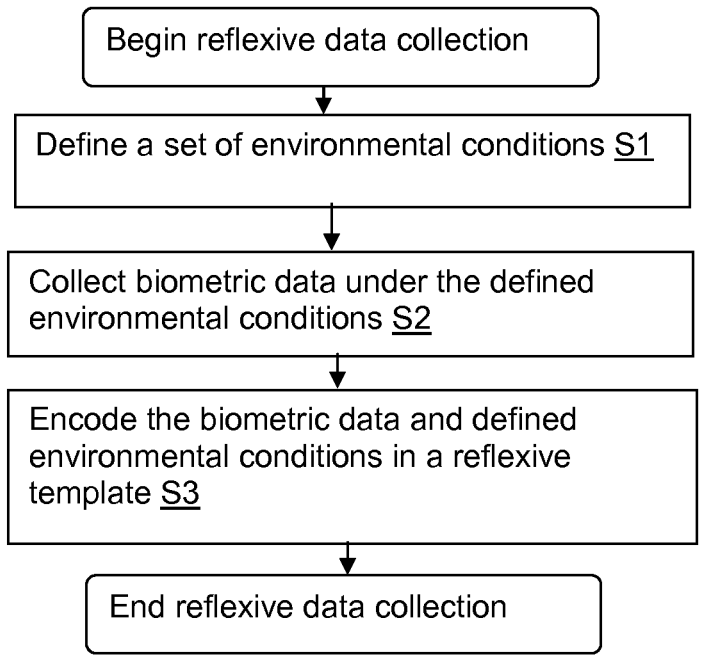
FIG. 3 depicts a flow diagram showing a process for collecting reflexive data in accordance with an embodiment of the invention."

FIG. 3 depicts a flow diagram showing a method of collecting reflexive data in an initial "set-up" mode for a subject individual. At step S1, a set of environmental conditions are defined. This may be done in any manner, e.g., randomly by a collection device, inputted by a user, etc. At S2, biometric data is collected under the defined environmental conditions. At S3, the biometric data and defined environmental conditions are encoded into a reflexive template.

Figure 4:
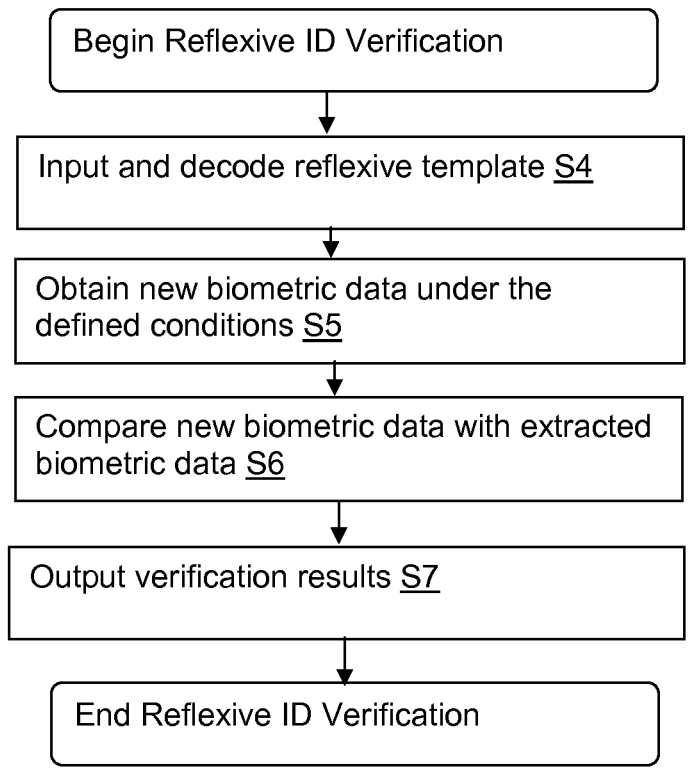
FIG. 4 depicts a flow diagram showing a process for verifying an identity in accordance with an embodiment of the invention.

FIG. 4 depicts a flow diagram showing a method for verifying a subject individual, i.e., a "verification mode." At S4, a reflexive template associated with the individual is obtained and decoded. Biometric data and environmental condition settings are extracted from the reflexive template. At S5, new biometric data is obtained from the individual under the extracted environmental condition settings. At S6, the new biometric data is compared with the extracted biometric data to determine if a match exists. Any type of compare operation, including those typically used in biometric matching may be utilized. At S7, the verification results are output.

Referring again to FIG. 1, it is understood that the reflexive data collection system 10 and reflexive data verification system 32 may each be implemented using any type of computing device (i.e., computer system). Such a computing device generally includes a processor, input/output (I/O), memory, and bus. The processor may comprise a single processing unit, or be distributed across one or more processing units in one or more locations, e.g., on a client and server. Memory may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a reflexive data collection system 10 and/or reflexive data verification system 32 could be created, maintained and/or deployed by a service provider that offers the functions described herein for customers. That is, a service provider could offer to deploy or provide the ability to collect and verify biometric data as described above.

It is understood that in addition to being implemented as a system and method, the features may be provided as a program product stored on a computer-readable medium, which when run, enables a computer system to provide a reflexive data collection system 10 and/or reflexive data verification system 32. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for collecting reflexive biometric data, comprising:
    a system for defining a set of environmental conditions;
    a stimulation system for automatically implementing the set of environmental conditions;
    a system for collecting biometric data under the set of environmental conditions, wherein the biometric data comprises a measurement collected from an eye of an individual, and wherein the set of environmental conditions comprises stimuli that cause a change to an iris of the individual by the stimulation system, the stimuli comprising: a light intensity setting of light directed at the individual by the stimulation system, a time setting that the individual is exposed to stimulation by the stimulation system, a field of view setting for the individual while stimulated by the stimulation system, a target image that is viewed by the individual while stimulated by the stimulation system, a depth of field of a target image that is viewed by the individual while stimulated by the stimulation system, a color of a target image that is viewed by the individual while stimulated by the stimulation system, and a temperature of an area that the individual is in while stimulated by the stimulation system; and
    a system for encoding the biometric data and the set of environmental conditions into a reflexive template.

2. The system of claim 1, wherein the measurement data is selected from a group comprising an iris shape and a pupil-to-iris dilation ratio.

3. The system of claim 1, wherein the stimuli dynamically change over a period of time.

4. The system of claim 1, wherein the reflexive template is stored in one of a portable token or a database.

5. A method, performed on a computer system, for collecting reflexive biometric data, comprising:
    using the computer system to perform actions comprising:
        defining a set of environmental conditions;
        automatically implementing the set of environmental conditions with a stimulation system;
        collecting biometric data under the set of environmental conditions, wherein the biometric data comprises a measurement collected from an eye of an individual, and wherein the set of environmental conditions comprises stimuli that causes a change to an iris of the individual by the stimulation system, the stimuli comprising: a light intensity setting of light directed at the individual by the stimulation system, a time setting that the individual is exposed to stimulation by the stimulation system, a field of view setting for the individual while stimulated by the stimulation system, a target image that is viewed by the individual while stimulated by the stimulation system, a depth of field of a target image that is viewed by the individual while stimulated by the stimulation system, a color of a target image that is viewed by the individual while stimulated by the stimulation system, and a temperature of an area that the individual is in while stimulated by the stimulation system; and
        encoding the biometric data and the set of environmental conditions into a reflexive template.

6. The method of claim 5, wherein the stimuli dynamically change over a period of time.

7. The method of claim 5, wherein the reflexive template is stored in one of a portable token or a database.

8. The method of claim 5, wherein the measurement is selected from a group comprising an iris shape and a pupil-to-iris dilation ratio.

9. A non-transitory computer readable medium having a program product stored thereon, which when run by a computer system, collects reflexive biometric data and comprises:
    program code for defining a set of environmental conditions;
    program code for implementing the set of environmental conditions with a stimulation system;
    program code for causing a device to collect biometric data under the set of environmental conditions, wherein the biometric data comprises a measurement collected from an eye of an individual, and wherein the set of environmental conditions comprises stimuli that cause a change to an iris of the individual by the stimulation system, the stimuli comprising: a light intensity setting of light directed at the individual by the stimulation system, a time setting that the individual is exposed to stimulation by the stimulation system, a field of view setting for the individual while stimulated by the stimulation system, a target image that is viewed by the individual while stimulated by the stimulation system, a depth of field of a target image that is viewed by the individual while stimulated by the stimulation system, a color of a target image that is viewed by the individual while stimulated by the stimulation system, and a temperature of an area that the individual is in while stimulated by the stimulation system; and program code for encoding the biometric data and the set of environmental conditions into a reflexive template.

10. The non-transitory computer readable medium of claim 9, wherein the stimuli dynamically change over a period of time.

11. The non-transitory computer readable medium of claim 9, wherein the reflexive template is stored in one of a portable token or a database.

12. The non-transitory computer readable medium of claim 9, wherein the measurement is selected from a group comprising an iris shape and a pupil-to-iris dilation ratio.

* * * * *